May 15, 1934.    G. W. SCHILLING    1,959,040
AMUSEMENT APPARATUS
Filed April 4, 1932    3 Sheets-Sheet 1

Inventor:
George W. Schilling,
By Jas. C. Hobensmith
Attorney.

May 15, 1934.          G. W. SCHILLING          1,959,040
                        AMUSEMENT APPARATUS
                      Filed April 4, 1932          3 Sheets-Sheet 2

Inventor:
George W. Schilling,
By Jas. C. Wobensmith
Attorney.

May 15, 1934.   G. W. SCHILLING   1,959,040
AMUSEMENT APPARATUS
Filed April 4, 1932   3 Sheets-Sheet 3

Inventor:
George W. Schilling,
By Jas. C. Wobensmith
Attorney.

Patented May 15, 1934

1,959,040

UNITED STATES PATENT OFFICE 1,959,040

AMUSEMENT APPARATUS

George W. Schilling, Philadelphia, Pa.

Application April 4, 1932, Serial No. 602,951

8 Claims. (Cl. 273—153)

My invention relates to amusement apparatus in the nature of a puzzle or game, involving an arrangement of numbered and/or lettered blocks, by means of which various magic squares may be constructed and various puzzles are provided.

The principal object of my invention is to provide amusement apparatus of a novel character, by means of which various magic squares may be constructed, and certain of the principles and characteristics thereof may be demonstrated.

A further object of my invention is to provide a novel form of container and a series of blocks adapted to be disposed therein in various relationships, thereby to provide means for constructing magic squares of different types.

A further object of my invention is to provide apparatus of the character aforesaid, by means of which various puzzles are provided.

A further object of my invention is to provide, in apparatus of the character aforesaid, a series of blocks each having numerals and/or letters displayed on its several faces according to a certain plan or scheme, so that said blocks may be readily shifted in groups, whereby an arrangement of numerals or letters, having a certain relation to each other, may be changed to another and different arrangement of numerals or letters, also having a certain relation to each other.

With the foregoing objects in view, my invention contemplates, in its preferred embodiment, the provision of a novel series of blocks, each bearing designations on its several faces; and a novel form of container in which said blocks are adapted to be positioned, the top face of said container being provided with designations having a certain relation to the designations on the displayed faces of the blocks when said blocks are arranged according to a certain plan or scheme.

The nature and characteristic features of my invention will be more readily understood from the following description, taken in connection with the accompanying drawings forming part hereof, in which:

Fig. 6 is a top or plan view of the device, the blocks being shown arranged in the container in the form of a magic square of the fourth order;

Fig. 7 is a view similar to Fig. 6, but with the blocks turned to display other faces, and arranged in conjunction with certain of the designations on the top face of the container to form a magic square of the fifth order;

Fig. 8 is a similar view, with the blocks turned to display still other faces, and arranged to form another and different magic square of the fifth order, the container being turned around so as to cause the numbers displayed on the top face thereof to read right side up;

Fig. 9 is a view similar to Fig. 6, but with the faces of the blocks turned to display a portion of the alphabet thereon;

Figure 1:
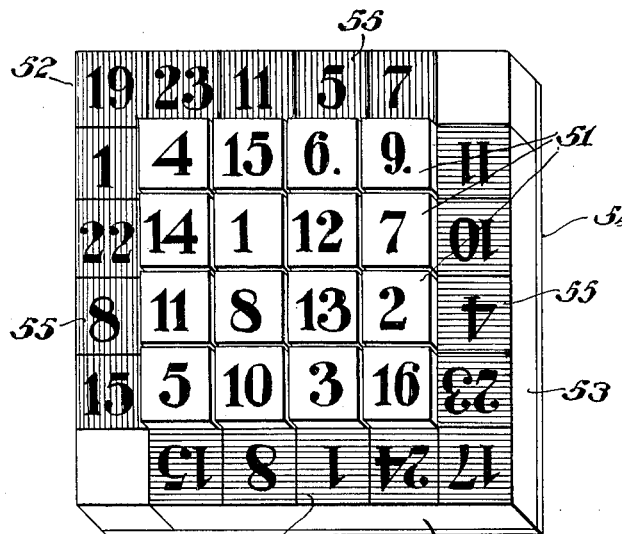
Figure 1 is a perspective view of amusement apparatus embodying the main features of my present invention.
Figure 4:
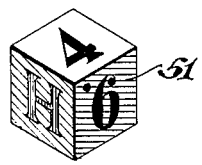
Fig. 4 is a perspective view of one of the blocks, looking toward one corner thereof.
Figure 5:
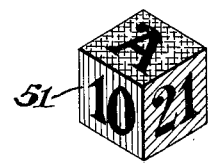
Fig. 5 is a similar view of the same block, looking toward the opposite corner thereof.
Figure 2:
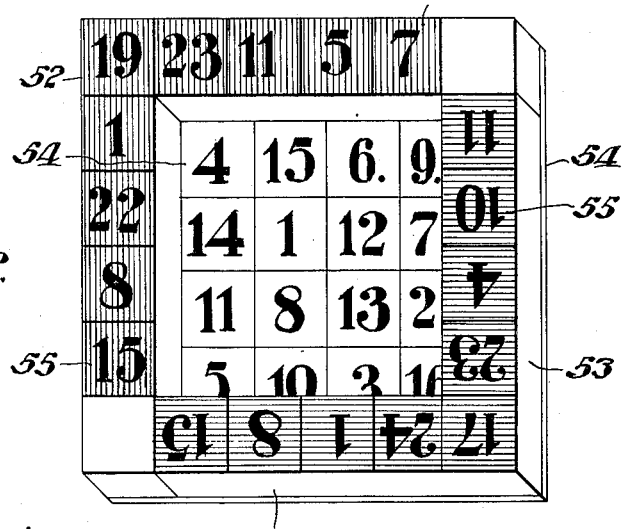
Fig. 2 is a similar view of the container, with the blocks removed therefrom.
Figure 3:
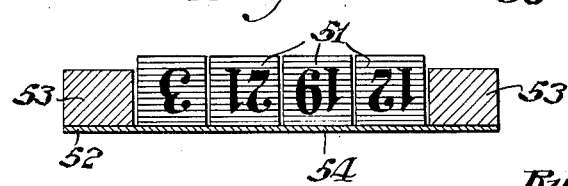
Fig. 3 is a vertical, central, transverse section of the container, with the blocks shown in elevation therein.

It will, of course, be understood that the description and drawings herein contained are illustrative merely, and that various changes and modifications may be made in the structure disclosed without departing from the spirit of my invention.

Throughout this specification, the word "vertical" means at right angles to the edge of the container nearest the user, and the word "horizontal" means parallel to that edge. By the "top face" is meant the exposed or displayed face at a particular stage of the manipulation. By the "upper row" or "upper edge" is meant the row or edge, as the case may be, most remote from the user, and by the "bottom row" or "bottom edge" is meant the row or edge, as the case may be, which is nearest the user.

In the embodiment of my invention shown in the drawings, a series of sixteen blocks 51 are provided, each block being cubical in form and having certain numbers and letters displayed on its several faces, according to a certain plan.

Each of the blocks has all of its faces preferably of different colors, thereby to prevent confusion and to facilitate the arrangement of the blocks to form the magic squares and puzzles, as well as serving as a check on the transposition of the blocks in groups from one position to another, and to a certain extent adding to the attractiveness of the apparatus.

The designations on the faces of the blocks with respect to the various colors, in the arrangement shown in Figs. 1 and 6 of the drawings, may be according to the following schedule:

| White face | Red face | Blue face | Yellow face | Purple face | Green face |
|---|---|---|---|---|---|
| 4 | 10 | 9 | A | 21 | H |
| 15 | 17 | 2 | B | 3 | A |
| 6 | 24 | 25 | C | 25 | F |
| 9 | 13 | 18 | D | 15 | L |
| 14 | 14 | 3 | E | 9 | O |
| 1 | 3 | 21 | F | 31 | N |
| 12 | 6 | 19 | G | 5 | A I |
| 7 | 20 | 12 | H | 19 | O |
| 11 | 16 | 22 | I | 7 | P |
| 8 | 25 | 20 | J | 17 | D |
| 13 | 12 | 13 | K | 11 | T |
| 2 | 4 | 6 | L | 29 | V |
| 5 | 2 | 16 | M | 27 | E |
| 10 | 9 | 14 | N | 13 | * |
| 3 | 18 | 7 | O | 23 | H |
| 16 | 21 | 5 | P | 1 | E |

The container 52 comprises a box-like structure, the side walls 53 of which are of a width corresponding to the width of the blocks, but of a height slightly less than the height thereof, for a purpose to be presently explained. The bottom 54 of the container may comprise a relatively thin sheet of any preferred material such as wood or cardboard.

When the white faces of the blocks are arranged uppermost and disposed with the exposed numerals thereon arranged according to the plan illustrated in Figs. 1 and 6 of the drawings, the same will constitute a numerical magic square of the fourth order and of one of the preferred types, in which each of the rows of figures, either horizontal or vertical, each of the two diagonals, and any group of four adjoining blocks, will in each instance add up to 34.

For the purpose of assisting in the initial arrangement of the blocks in the order above described, the inner face of the bottom 54 of the container may be divided into squares corresponding in dimensions to the faces of the blocks, each square having designated thereon a numeral which will serve as a guide in placing the blocks in the proper order in the container.

When the blocks are arranged as illustrated in Figs. 1 to 4 of the drawings, the vertical row of blocks at either side may be lifted as a group out of the container, and transposed to the opposite side, the remaining blocks in the container being shifted bodily to permit the transposed blocks to be replaced as aforesaid, whereupon another and different magic square, having the same characteristics, will be provided.

Likewise, the horizontal row of blocks at either the top or bottom may be lifted as a group out of the container, transposed to the opposite side, and replaced in the container in like manner, to form still another and different magic square, which, however, will also have the same characteristics.

This may be done repeatedly, and it will be found that, as long as the transposition is made by shifting any row of blocks from any of the marginal edges to the opposite marginal edge, the result will in every instance be a magic square of the preferred type, in which each of the horizontal rows, each of the vertical rows, each of the diagonals, and each group of four adjoining blocks, will add up to 34.

The top face 55 of the frame comprising the side walls 53 of the container is divided into squares corresponding in dimensions to the faces of the blocks. Starting from the upper right hand corner (when the container is in the position shown in Figs. 1, 2, 6, 7, and 9 of the drawings), and extending along the upper and left hand edge, the squares laid out on the top face 55 of the frame of the container are colored red, and have displayed thereon a series of numerals according to a certain plan, constituting a portion of a magic square of the fifth order when read in conjunction with the designations on the red faces of the blocks, and when said blocks are arranged in the container according to a certain plan.

Likewise, starting at the lower right hand corner of the frame, and extending along the bottom and right hand edge thereof, the squares laid out on the top face 55 of said frame are colored blue, and have displayed thereon another and different series of numerals, comprising a portion of another and different magic square of the fifth order when read in conjunction with the blue faces of the blocks, and when said blocks are arranged in the container according to a certain plan.

Figure 12:
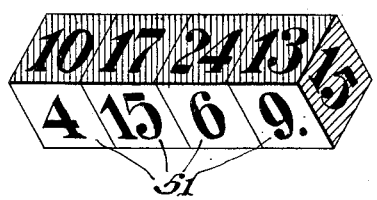
Fig. 12 is a perspective view illustrating the manner in which certain of the blocks are turned in a group to effect a transposition from one form to another.

When it is desired to transpose the blocks from the arrangement shown in Figs. 1 and 6 to that shown in Fig. 7 of the drawings, the upper horizontal row of four blocks is lifted out of the container as a group, and turned in unison about their common horizontal axis to bring the red faces uppermost. This group is then replaced in the container in the same horizontal order. The other horizontal rows are then successively manipulated in like manner. This manner of manipulating the blocks in horizontal groups of four is illustrated in Fig. 12 of the drawings.

It will be found that a magic square of the fifth order is thus provided, the numerals on the blocks being read in conjunction with those on the squares colored red on the top face of the frame provided by the side walls of the container.

Likewise, by a similar manipulation of the blocks in horizontal groups to bring the blue faces uppermost, another and different magic square of the fifth order will be provided by reading the numerals as thus displayed on the blue faces of the blocks in conjunction with those displayed on the squares colored blue on the top face of the frame of the container (see Fig. 8). However, when this is done, the container with the blocks therein will be turned about to cause the numerals to read right side up.

By lifting the blocks in horizontal groups of four, and turning the same until the yellow faces are uppermost, there will be displayed upon the blocks a series of letters constituting a portion of the alphabet, with the letters in proper sequence (see Fig. 9).

Figure 10:
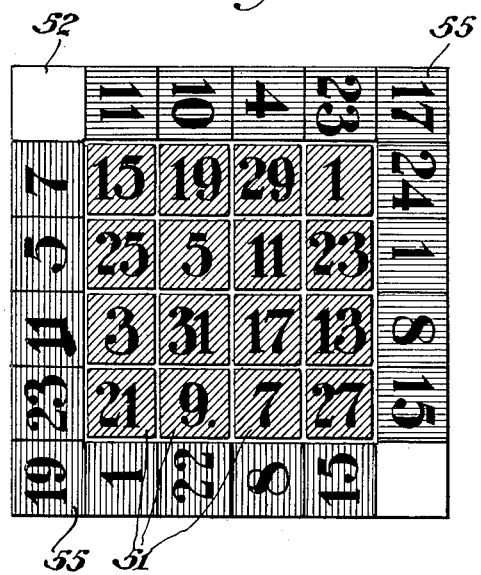
Fig. 10 is a view similar to Fig. 6, but with the container turned around to another and different position, and other and different faces of the blocks being turned up to form a magic square of the fourth order, in which all odd numbers are used.
Figure 13:
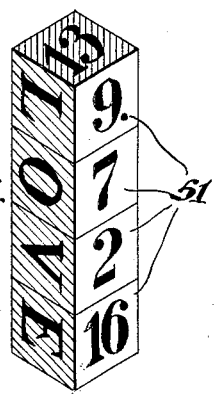
Fig. 13 is a similar view, illustrating a different method of transposing the blocks in groups to effect other arrangements.
Figure 14:
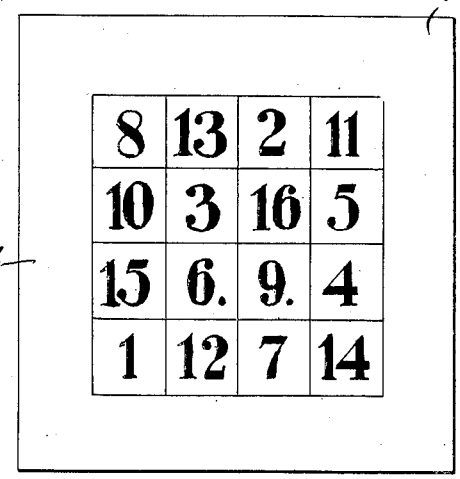
Fig. 14 is an underneath plan view of the container.

By lifting the blocks in vertical groups of four, and turning the same about their common axis, as indicated in Fig. 13 of the drawings, then replacing the same with their purple faces uppermost, and turning the container about to bring the numerals on the blocks right side up, there will be provided a magic square of the fourth order, in which only odd numbers are used, and in which each of the vertical and horizontal rows, as well as each of the diagonals, adds up to 64 (see Fig. 10).

Figure 11:
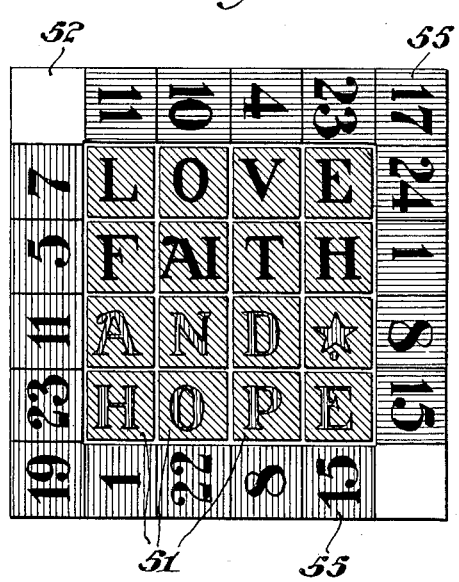
Fig. 11 is a view similar to Fig. 10, but in which other and different faces of the blocks are turned up to display certain letters arranged to form a phrase or legend.

By a similar manipulation to bring the green faces uppermost (see Fig. 11), there will be displayed the legend

L O V E

F AI T H

A N D *

H O P E

By making the height of the side walls 53 of the container slightly less than that of the blocks, the manipulation of the blocks in groups, as aforesaid, will be greatly facilitated, enabling the user readily to grasp the ends of each group and lift the same out of the container as a unit.

The apparatus may also be used to provide puzzles of several varieties. For example, by the removal from the container of the block which has the numeral "16" on its white face, the blocks may be arranged within the container to provide the well known "15" puzzle.

Another interesting puzzle may be provided by arranging all of the blocks in the container to form a magic square, then removing the block which has the numeral "16" on its exposed face, then shifting the blocks one at a time, utilizing the empty space provided, in a manner similar to that of the usual manipulation in connection with the "15" puzzle, until the blocks are finally arranged within the container in regular numerical sequence.

Still another puzzle may be provided by first arranging the blocks within the container with the white faces uppermost, and with the numerals displayed thereon in regular numerical sequence, then turning the blocks over individually until the yellow faces are displayed, then removing the block which has the letter "P" on its exposed face, and then attempting to shift the blocks one by one, utilizing the empty space provided by the removal of the letter "P", until all of the letters displayed on the blocks are in alphabetical sequence.

A puzzle may also be provided by using the yellow faces of the blocks, which have a portion of the alphabet displayed thereon, and removing the block having the letter "P" on its yellow face. By this arrangement, a puzzle similar to the "15" puzzle, but in which letters are used instead of numerals, may be provided.

To provide another puzzle, the blocks may be shuffled outside of the container and then replaced therein with their green faces uppermost. A person having no knowledge of what the result should be may then be required to arrange the blocks in the container to form a legend, which arrangement when properly carried out will be as follows:

L O V E

F AI T H

A N D *

H O P E

Numerous other numeral and letter puzzles may also be devised in connection with the apparatus.

I claim:

1. Apparatus of the character described, comprising a plurality of blocks and a container therefor; the several faces of each of said blocks having designations thereon; the container comprising a frame within which the blocks are adapted to be arranged; the top face of the frame being divided into squares corresponding in dimensions to the faces of the blocks and having designations thereon; the designations on one series of faces of the blocks comprising numerals adapted to be arranged to form a magic square of a certain order; and the designations on another series of faces of said blocks comprising numerals adapted to be arranged to form, in conjunction with certain of the designations on the top face of the frame, a magic square of another order.

2. Apparatus of the character described, comprising a plurality of cubical blocks and a container therefor; the several faces of each of said blocks having designations thereon; the container comprising a frame within which the blocks are adapted to be arranged; the top face of the frame being divided into squares corresponding in dimensions to the faces of the blocks and having designations thereon; the designations on one series of faces of the blocks comprising numerals adapted to be arranged to form a magic square of the fourth order; the designations on another series of faces of said blocks comprising numerals adapted to be arranged to form, in conjunction with certain of the designations on the top face of the frame, a magic square of the fifth order; the designations on another series of faces of said blocks comprising numerals adapted to be arranged to form, in conjunction with other designations on the top face of the frame, another and different magic square of the fifth order; the designations on another series of faces of said blocks comprising letters adapted to be arranged in alphabetical sequence; the designations on another series of faces of said blocks comprising numerals adapted to be arranged to form another and different magic square of the fourth order; and the designations on another series of faces of said blocks comprising letters adapted to be arranged to form a phrase or legend.

3. Apparatus of the character described, comprising a plurality of cubical blocks and a container therefor; the several faces of each of said blocks being differently colored, and having designations thereon; the container comprising a frame within which the blocks are adapted to be arranged; the top face of the frame being divided into squares corresponding in dimensions to the faces of the blocks, certain of said squares on the top face of the frame being colored to correspond with certain faces of the blocks and having designations thereon; the designations on one series of faces of the blocks comprising numerals adapted to be arranged to form a magic square of the fourth order; the designations on another series of faces of said blocks comprising numerals adapted to be arranged to form, in conjunction with certain of the designations on the top face of the frame, a magic square of the fifth order; the designations on another series of faces of said blocks comprising numerals adapted to be arranged to form, in conjunction with other designations on the top face of the frame, another and different magic square of the fifth order; the designations on another series of faces of said blocks comprising letters adapted to be arranged in alphabetical sequence; the designations on another series of faces of said blocks comprising numerals adapted to be arranged to form another and different magic square of the fourth order; and the designations on another series of faces of said blocks comprising letters adapted to be arranged to form a phrase or legend.

4. Apparatus of the character described, comprising a plurality of cubical blocks and a container therefor; the several faces of each of said blocks having designations thereon; the container comprising a frame within which the blocks are adapted to be arranged; the top face of the frame being divided into squares corresponding in dimensions to the faces of the blocks; and certain of said squares on the top face of the frame having designations thereon adapted to form a desired arrangement in conjunction with the designations on certain of the faces of the blocks.

5. Apparatus of the character described, comprising a plurality of cubical blocks and a container therefor; the several faces of each of said blocks having designations thereon; the designations on the several faces of the blocks having a certain corelation to each other, whereby when the blocks are initially disposed with the designations on their displayed faces arranged according to a certain plan they may be shifted in groups to cause the displayed designations to be arranged according to another and different plan; the container comprising a frame within which the blocks are adapted to be arranged; the top face of the frame being divided into squares corresponding in dimensions to the faces of the blocks; and certain of said squares on the top face of the frame having designations thereon adapted to form a desired arrangement in conjunction with the designations on certain of the faces of the blocks.

6. Apparatus of the character described, comprising a plurality of cubical blocks and a container therefor; the several faces of each of said blocks being differently colored, and having designations thereon; the designations on the several faces of the blocks having a certain corelation to each other, whereby when the blocks are initially disposed with the designations on their displayed faces arranged according to a certain plan they may be shifted in groups to cause the displayed designations to be arranged according to another and different plan; the container comprising a frame within which the blocks are adapted to be arranged; the top face of the frame being divided into squares corresponding in dimensions to the faces of the blocks; certain of said squares on the top face of the frame being colored to correspond with certain faces of the blocks, and having designations thereon adapted to form a desired arrangement in conjunction with the designations on the similarly colored faces of the blocks.

7. Apparatus of the character described, comprising a plurality of cubical blocks and a container therefor; the several faces of each of said blocks being differently colored, and having designations thereon; the designations on the several faces of the blocks having a certain corelation to each other, whereby when the blocks are initially disposed with the designations on their displayed faces arranged according to a certain plan they may be shifted in groups to cause the displayed designations to be arranged according to another and different plan; the container comprising a frame within which the blocks are adapted to be arranged; said frame being of a depth slightly less than the depth of the blocks, thereby to permit the user to grasp and manipulate the blocks in unitary groups; the top face of the frame being divided into squares corresponding in dimensions to the faces of the blocks; and certain of said squares on the top face of the frame being colored to correspond with certain faces of the blocks, and having designations thereon adapted to form a desired arrangement in conjunction with the designations on the similarly colored faces of the blocks.

8. Apparatus of the character described, comprising a plurality of cubical blocks and a container therefor; the several faces of each of said blocks being differently colored, and having designations thereon; the designations on the several faces of the blocks having a certain corelation to each other, whereby when the blocks are initially disposed with the designations on their displayed faces arranged according to a certain plan they may be shifted in groups to cause the displayed designations to be arranged according to another and different plan; the container comprising a frame within which the blocks are adapted to be arranged, said frame being of a depth slightly less than the depth of the blocks, thereby to permit the user to grasp and manipulate the blocks in unitary groups; the top face of the frame being divided into squares corresponding in dimensions to the faces of the blocks; certain of said squares on the top face of the frame being colored to correspond with certain faces of the blocks, and having designations thereon adapted to form a desired arrangement in conjunction with the designations on the similarly colored faces of the blocks; and the container having a bottom member the inner face of which is divided into squares corresponding in dimensions to the faces of the blocks, said squares also having designations thereon indicative of a certain initial arrangement of the blocks within the container.

GEORGE W. SCHILLING.